United States Patent
Chigakkagari et al.

(10) Patent No.: US 10,620,929 B2
(45) Date of Patent: Apr. 14, 2020

(54) EVALUATING GATES FOR SOFTWARE IN PIPELINE DELIVERY

(71) Applicant: Microsoft Technology Licensing, LLC, Redmond, WA (US)

(72) Inventors: Gopinath Hanumappagari Chigakkagari, Hyderabad (IN); Shashank Bansal, Hyderabad (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/986,721

(22) Filed: May 22, 2018

(65) Prior Publication Data

US 2019/0361688 A1 Nov. 28, 2019

(51) Int. Cl.
| | |
|---|---|
| *G06F 8/60* | (2018.01) |
| *G06F 11/34* | (2006.01) |
| *G06F 11/30* | (2006.01) |
| *G06F 11/36* | (2006.01) |

(52) U.S. Cl.
CPC ............ *G06F 8/60* (2013.01); *G06F 11/302* (2013.01); *G06F 11/3409* (2013.01); *G06F 11/3692* (2013.01)

(58) Field of Classification Search
CPC ....................................................... G06F 8/60
USPC ......................................................... 717/177
See application file for complete search history.

(56) References Cited

U.S. PATENT DOCUMENTS

| | | | |
|---|---|---|---|
| 8,135,775 | B1 | 3/2012 | Anderson et al. |
| 8,464,246 | B2 | 6/2013 | Davies et al. |
| 8,561,010 | B2 | 10/2013 | Colgrave et al. |
| 9,319,286 | B2 | 4/2016 | Panuganty |
| 9,454,351 | B2 | 9/2016 | Anderson et al. |
| 9,575,738 | B1 | 2/2017 | Chopra et al. |
| 9,740,478 | B2 | 8/2017 | Doganata et al. |
| 10,120,670 | B1* | 11/2018 | Atkinson ............ G06F 9/45512 |

(Continued)

OTHER PUBLICATIONS

Michiel Rook; "A Typical CI/CD Pipeline Explained"; michielrook.nl blog p. (full url in ref.); Jan. 19, 2018 (Year: 2018).*

(Continued)

*Primary Examiner* — Qing Chen
*Assistant Examiner* — Clint Thatcher
(74) *Attorney, Agent, or Firm* — Alleman Hall Creasman & Tuttle LLP

(57) ABSTRACT

A computing system is provided. The computing system includes a client device with a user interface, a server host, and a processor configured to execute a continuous delivery (CD) pipeline and communicate with a cloud-based hosting environment. The processor is configured to receive a staging request for software to be deployed to the cloud-based hosting environment. The processor is configured to initialize and execute a gate on a CD platform, the gate including criteria for evaluation of the software with at least one query defining results data; deploy software to a target environment; and, during a monitoring period, continuously receive and monitor results data from the software. The processor is configured to evaluate the results data, change a state of the gate, determine that approval conditions have been met for the software, and deploy the software to a production environment of the cloud-based hosting environment.

20 Claims, 9 Drawing Sheets

(56) References Cited

U.S. PATENT DOCUMENTS

| | | | |
|---|---|---|---|
| 10,146,524 B1* | 12/2018 | Killmon | G06F 8/65 |
| 2017/0154189 A1 | 6/2017 | Betzler et al. | |
| 2017/0180266 A1* | 6/2017 | Frank | H04L 67/16 |
| 2017/0180459 A1* | 6/2017 | Frank | H04L 67/10 |
| 2017/0201569 A1* | 7/2017 | Fu | H04L 67/34 |
| 2019/0138288 A1* | 5/2019 | Brealey | G06F 8/65 |

OTHER PUBLICATIONS

"Continuous Delivery"; Wikipedia.org webpage; May 20, 2018 (Year: 2018).*

* cited by examiner

Pre-deployment conditions                                                              IDE GUI 74

Triggers ⌄
Define the trigger that will start deployment to this environment

---

Pre-deployment approvals                                                    ⬤○ Disabled
Select users who can approve or reject deployments to this environment

---

Gates ⌃                                                                     ○⬤ Enabled
Define gates to evaluate before the deployment Delay before evaluation

| 30 | Minutes ⌄ |

Deployment gates                                                                        ＋ Add

| Check ServiceNow Change request status | Create a ServiceNow change request |
| Query Work Items | Get TWITTER© Sentiment (calculate sentiment of tweets for a hashtag) |
| Settings for Check ServiceNow Change request status | Invoke AZURE© Function (Invoke AZURE© function as a part of your process) |
| Wait on blocking bugs | Invoke REST API (Invoke REST API as a part of your process) |
| | Query AZURE© Monitor Alerts (Observe the configured AZURE© monitor rules for active alerts) |
| | Query status of a ServiceNow change request |
| | Query Work Items (Executes a work item query and checks for the number of items returned) |

---

Evaluation options ⌃

Time between re-evaluation of gates

| 5 | Minutes ⌄ |

Timeout after which gates fail

| 1 | Day ⌄ |

Gates and approvals
○ Before gates, ask for approvals
⬤ On successful gates, ask for approvals
○ Ignore outcome of gates and ask for approvals

FIG. 5

Pre-deployment conditions

IDE GUI 74

Triggers ⌄
Define the trigger that will start deployment to this environment

---

Pre-deployment approvals
Select users who can approve or reject deployments to this environment ⚪ Disabled

---

Gates ⌃
Define gates to evaluate before the deployment

⚫ Enabled

Delay before evaluation

| 30 | Minutes ⌄ |

Deployment gates

Query Work Items

Display name

| Query Work Items |

Query

| Feedback_Program |

Upper threshold

| 0 |

Advanced ⌄

---

Evaluation options ⌃

Time between re-evaluation of gates

| 5 | Minutes ⌄ |

Timeout after which gates fail

| 1 | Day ⌄ |

Gates and approvals
- ⚪ Before gates, ask for approvals
- ⚫ On successful gates, ask for approvals
- ⚪ Ignore outcome of gates and ask for approvals

FIG. 6

Post-deployment conditions                                      IDE GUI 74

Post-deployment approvals                                         ⬤⚪ Disabled
Select users who can approve or reject deployments to this environment

---

Gates ⌃                                                            ⚪⬤ Enabled
Define gates to evaluate after the deployment Delay before evaluation

| 1 | Minutes ⌄ |

Deployment gates
    Wait for no active alerts                    ⚪⬤ Enabled
    Wait on active feedback                      ⚪⬤ Enabled Display name

| Wait on active feedback |

AZURE© subscription

| XYZ-123 |

Query

| Feedback_Program |

Upper threshold

| 0 |

Advanced ⌄

---

Evaluation options ⌃

Time between re-evaluation of gates

| 5 | Minutes ⌄ |

Timeout after which gates fail

| 1 | Day ⌄ |

Gates and approvals
    ○ Before gates, ask for approvals
    ● On successful gates, ask for approvals
    ○ Ignore outcome of gates and ask for approvals

FIG. 7

EVALUATING GATES FOR SOFTWARE IN PIPELINE DELIVERY

BACKGROUND

The landscape of software release is currently evolving as new trends and innovations are explored. A major goal of software development is to enable continuous delivery of value to end users of products, which may involve numerous individuals, processes, and products. The arena of "DevOps", a portmanteau of "Development" and "Operations", has grown to include multidisciplinary teams that may execute shared practices and tools, in contrast with conventional software development where development teams may code software to be tested over multiple trials toward an end goal of delivering a finished product to users that will be monitored for issues. Instead, DevOps recommends a multi-stage delivery pipeline for products that may be managed by a single multidisciplinary team. Once code is prepared, the software may traverse various stages, each of which serves a specific purpose. In a development environment, the software may undergo functional and performance tests, followed by deployment to a staging environment. In the organization of DevOps, a gradual exposure of software and updates to end users may be executed, such that exposure of the software in a production environment is split into multiple stages of deployment. Updates may be delivered to limited sets of users throughout the stages of deployment and monitored before being made available to a larger set of users. Once the deployed software has met and passed criteria and validation as set by the DevOps team according to the interests of stakeholders, it may be made available to all users.

In the DevOps pipeline, testing and monitoring of the software involves close observation. One aspect of the practice of DevOps is a continuous integration/continuous delivery (CI/CD) pipeline, where code building and integration occurs regularly in conjunction with continuous delivery of software to target environments. Transitioning from one stage to a next stage may aid successful and efficient delivery of the product. Monitoring programs control these transitions and may involve an extensive sign-off checklist prioritizing test results, application health, user experience, and other criteria. The sign-off checklist may differ between stages of the pipeline and may be actively managed and changed. While releasing the software, the checklist may need to be repeated until all of the criteria are completely and collectively met in the release environment.

SUMMARY

A computing system is provided. The system may include a client device configured to communicate with a server host and include a user interface; the server host may include a processor configured to execute a continuous delivery (CD) pipeline and communicate with a cloud-based hosting environment including one or more web servers. The processor may be configured to receive a staging request from a developer for software to be deployed to a target environment of the cloud-based hosting environment. The processor may be further configured to, in response to developer input, initialize and execute a gate for the software to be deployed, the gate including criteria for evaluation of the software to be deployed, the gate being configured to include at least one query, the at least one query defining results data to be generated from execution of the software in the target environment. The processor may be configured to deploy the software to be accessible to a subset of end users in a target environment of the cloud-based hosting environment.

During a monitoring period, the processor may be configured to continuously receive and monitor, from the target environment of the cloud-based hosting environment and as determined by at least one query, the results data from the deployed software. The processor may be further configured to evaluate the results data according to the criteria for evaluation and change a state of the gate as determined by the evaluation. The processor may be configured to determine that approval conditions have been met for the software, at least in part based on the changed state of the gate, and deploy the software to a production environment of the cloud-based hosting environment to be accessible to end users.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 is an example implementation of a user interface of the computing system of FIG. 2, for setting pre-deployment conditions for software to be deployed to a target environment.

FIG. 6 is a further implementation of the user interface of FIG. 5, for setting pre-deployment conditions for software to be deployed to a target environment.

FIG. 7 is an example implementation of a user interface of the computing system of FIG. 2, for setting post-deployment conditions for software deployed for monitoring.

DETAILED DESCRIPTION

Given the management of software monitoring, delivery and deployment as described above, the inventors have recognized a potential for streamlining and automating deployment of software in various environments, while maintaining a strict quality control. It will be appreciated that the computing system implementations described herein may have particular relevance to DevOps systems, and specifically in a continuous integration/continuous delivery (CI/CD) pipeline. Sign-off checklists between a development environment and a staging environment, and between the staging environment and a production environment, may be extensive, involve multiple developers applying a variety of criteria, and be dependent to various extents on relative testing choices made by the developers. Additionally, sign-off checklists for software validation are generally manually executed, thus validation may involve significant work hours and communication between developers about various tests and criteria. Once software has been deployed to a target environment, developers, at the request of stakeholders, may conduct functional testing of the software, monitor the health of the software, receive user/customer feedback, and monitor infrastructure performance. Other aspects of software monitoring may include evaluation of policy adherence. Consequently, for a team of developers, the overall process of software monitoring may be exacting and frustrating without some elements of automation, standardization, and predictability.

In consideration of these challenges, the inventors have responded with a computing system that may automate various stages of the software monitoring and deployment process, with a potential for end-to-end automation. Unlike manual monitoring of software, the computing system described herein may be configured to execute partial automation of testing, monitoring of results data over predetermined time periods, or continuous reception of results data and even have approval and deployment of software.

Figure 1:
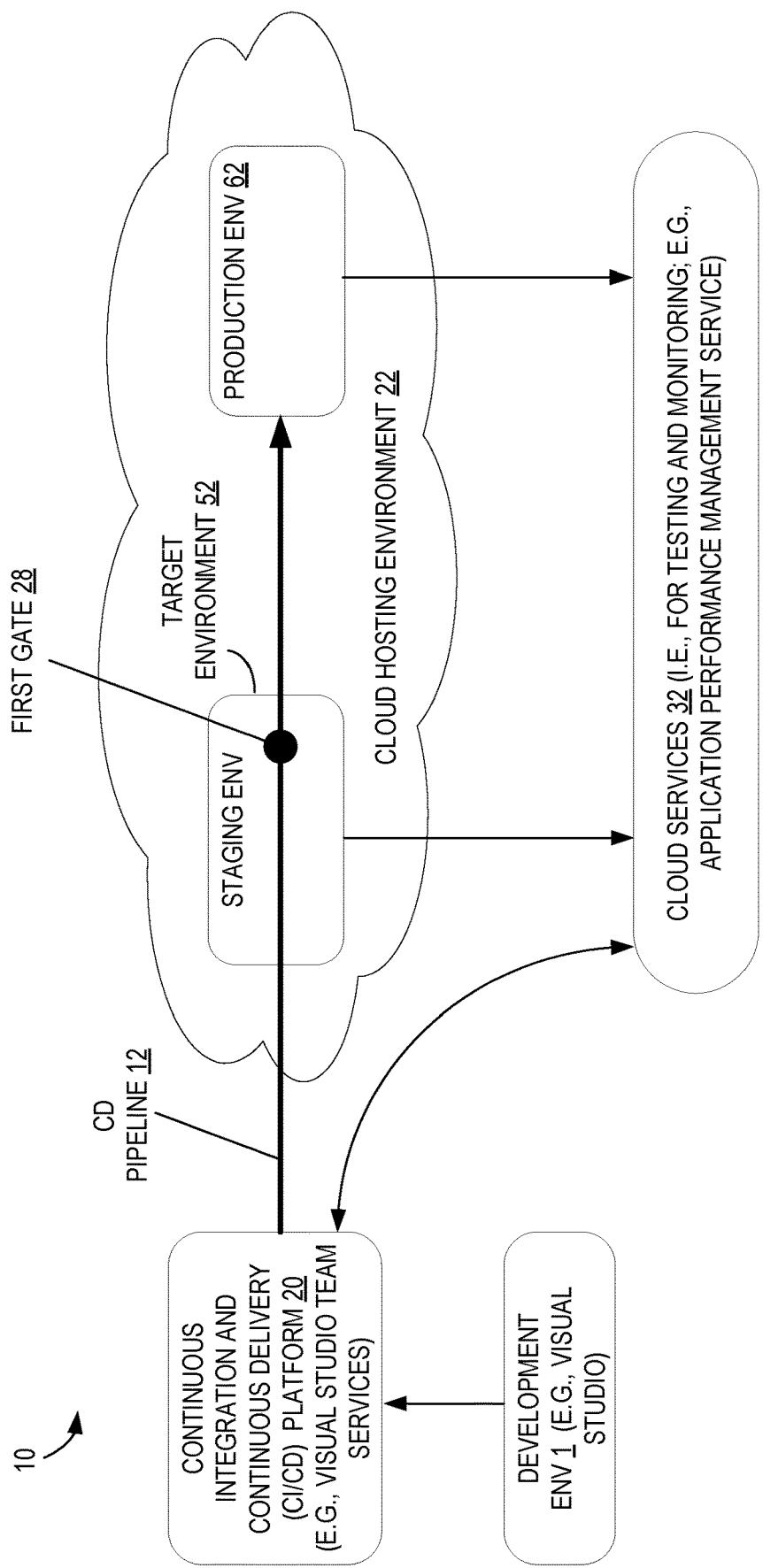
FIG. 1 shows an implementation of a continuous integration/continuous delivery (CI/CD) system for software delivery and deployment.

FIG. 1 depicts an implementation of a continuous integration/continuous delivery (CI/CD) system for software delivery and deployment, which is one implementation of a computing system 10 for deployment of software. In this CI/CD system, which may include only continuous delivery (CD) in instances that do not implement continuous integration (CI) of code in a development environment 1, developers may construct code in a development environment 1, which may include, for example, MICROSOFT VISUAL STUDIO. A platform 20 such as VISUAL STUDIO TEAM SERVICES (VSTS) may be used as a CI/CD platform from which software 34 to be deployed may be tested, monitored, managed, and deployed. From within the platform 20, a CD pipeline 12 may be executed. The software 34 may be deployed to a staging environment/target environment 52 within a cloud hosting environment 22 for monitoring. At this point in the process, the software 34 may be exposed to a limited number or predefined set of users, from whom the developers may receive feedback in addition to functional testing and health evaluation of the software 34. Cloud services 32, which may include MICROSOFT APPLICATION INSIGHTS or similar application performance management (APM) services as well as other cloud services 32, may be employed in the monitoring and management of software 34. A first gate 28, which may be one of a plurality of gates, may be established by the developers as criteria for validation of the software 34, as discussed in detail below. Once the gates, including at least the first gate 28, are in a pass or "greenlight" state, software 34 may be validated and deployed to production environment 62 to be widely accessible to end users in the cloud hosting environment 22.

Figure 2:
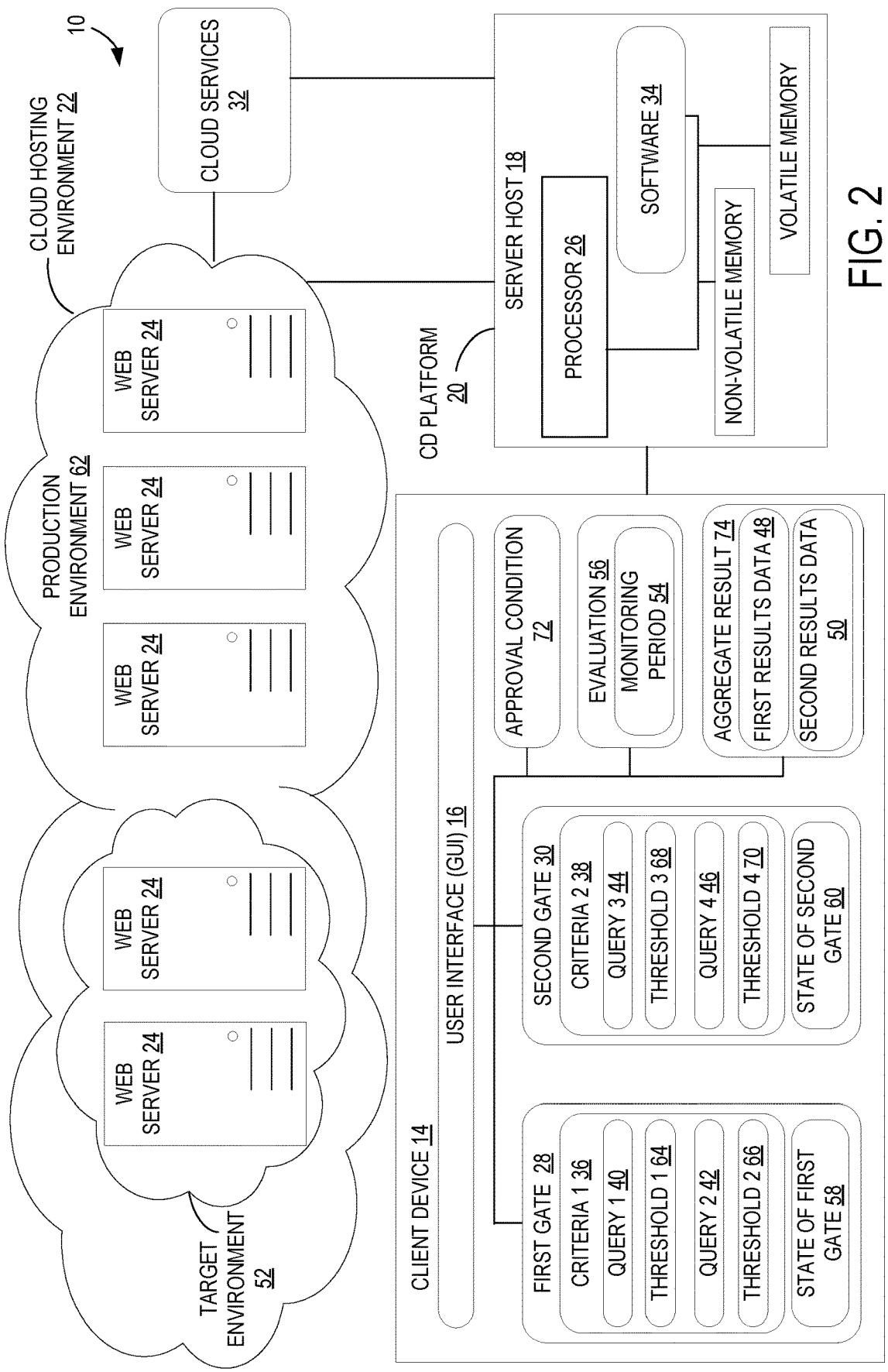
FIG. 2 shows a computing system for management of a pipeline for software delivery in the system of FIG. 1, according to one implementation of the present disclosure.

FIG. 2 shows one implementation of the computing system 10 for deployment of software 34 detailing an implementation of the CD platform 20 for a CD pipeline 12, which may be a CI/CD pipeline when CI is employed in the development environment 1. It will be appreciated that the computing system 10 may assist a team in the management of a DevOps pipeline. The computing system 10 may include a client device 14 configured to communicate with a server host 18 and include a user interface (e.g., graphical user interface, GUI) 16. The server host 18 may include a processor 26 configured to execute a CD pipeline 12 and communicate with a cloud-based hosting environment 22. The cloud-based hosting environment 22 may be, for example, the MICROSOFT AZURE environment, or other suitable cloud hosing environment 22 that may include one or more web servers 24. It will be appreciated that the servers may be application servers as well in some implementations.

The processor 26 may be configured to receive a staging request from a developer for software 34 to be deployed to a target environment 52 of the cloud hosting environment 22. In the implementation shown in FIG. 2, a user interface 16 of the client device 14 may be used to access cloud services 32. Via developer input, the processor 26 may be further configured to initialize and execute a first gate 28 on the CD platform 20 for the software 34 to be deployed. The first gate 28 may include criteria 36 for evaluation 56 of the software 34 to be deployed. The first gate 28 may be configured to include at least one query 40. The at least one query 40 may define first results data 48 to be generated from execution of the software 34 in the target environment 52.

FIG. 5 shows an example user interface 16 from which a first gate 28 may be defined and enabled. As shown, a developer may have optional triggers that may be set to start deployment to a particular environment. Also, the developer may set pre-deployment approvals. Under such conditions, a developer may establish a selection of users that may approve or reject deployments of software 34 to the environments, or designate a check for bugs that, if found, prevents deployment of the software 34 to the target environment 52. The processor 26 may be further configured to define and enable a plurality of gates 28, 30 in the CD pipeline 12, shown as first gate 28 and second gate 30 in CD platform 20 in FIG. 2. The processor 26 may generate an aggregate result 74 from a plurality of states 58, 60 associated with a respective gate of the plurality of gates 28, 30. The plurality of gates 28, 30 may include gates for evaluation of the health of the software 34, gates for querying user/customer reported incidents, gates for querying results data generated from end user interactions with the software 34, and/or gates for functional tests executed on the software 34. It will be appreciated that the number of gates defined and enabled by a developer will depend on the monitoring and management strategy to be employed; although the monitoring process may be automated to the extent desired by the developer, gates 28, 30 may be added, removed, or changed as seen fit by the developer during the monitoring process. As shown in FIG. 5, a variety of gates 28, 30 may be available; templates may be provided to developers for gates 28, 30 and their respective parameters. Gates 28, 30 may be templates, built-in functions, or may be partially or fully customizable; gates 28, 30 may be fully extensible. FIG. 6 shows an additional example of the user interface 16, where a gate 28 is being manually set. In this example, a developer has chosen "Feedback_Program" as a customized query 40. Another example customized query 40 may be "Blocking Bugs", where a developer may define a limited number of bugs to be acceptable for the validation of software 34.

FIG. 7 shows a post-deployment setting page of the user interface 16 according to one example implementation. Post-deployment gates may be evaluated after the software 34 has been deployed to a target environment 52. Thus, using both pre-deployment and post-deployment gates may reduce the occurrence of bugs and allow user feedback to be processed more efficiently for potentially quicker evaluation of the software 34. Post deployment gates may monitor, for example, the speed at which an application is running, web page loading, and/or errors therein. A developer may choose to wait for active alerts or wait on active feedback for evaluation of software 34, as shown in FIG. 7. Alerts may occur, for example, when code is deployed that results in web page loading that is below an acceptable amount of pre-defined time.

As shown in FIG. 5, one example of a first gate 28 may include garnering of social network sentiments (e.g., from a social network such as TWITTER or FACEBOOK) as criteria 36, where a query 40 may be set to evaluate the sentiments of tweets for a hashtag. In this implementation, a cognitive service of cloud services 32 may be invoked to evaluate the sentiments. For example, sentiments may be categorized as positive or negative feedback about an aspect of the software 34, thus supplying results data 48 to the CD pipeline 12. As also shown in FIG. 5, cloud hosting functions or REST APIs (Representational State Transfer Application Programming Interface) may be invoked when setting the gates 28, 30. A virtually limitless variety of queries 40 may be formulated. Some specific additional examples of query 40 may be a query for a number of abandoned shopping carts at a storefront website, a query for a number of shoppers from a specific geographic location concurrently accessing the storefront website, etc.

Crowd statistics may be employed in setting query 40 as well. For example, during one day of testing a deployment of software 34 in a target environment 52 affecting operation of a website may be observed and analyzed via cloud services 32. It may be revealed through the analysis that users of the website avoid a particular operation of the website that is being tested. For a second day of testing, the query 40 may be modified to determine whether the operation of the website avoided by users is in response to a particular aspect of the operation. The operation may be, for example, entering information into a field of the website as opposed to clicking an icon; query 40 may be modified to test not only use of the field or icon but type of field entry. A potential advantage of modifying the query 40 may be to decrease the time to validation of the software 34; automated monitoring and evaluation of feedback in the form of results data 48, 50 may allow the achievement of faster results for validation.

As shown in FIG. 5, third-party services such as TWITTER, GOOGLE, and others may be invoked in the defining of gates 28, 30. This may be accomplished by, for example, invoking REST APIs and/or cloud services 32. Thus, a first gate 28 may define a query 40 to be sent periodically or under a predefined condition from the cloud service 32 to an API of the third-party service, which may be a REST API or an API of another type, for example. The query 40 may request data from the third party service such as sentiment data for analysis via cognitive services, use statistics on operational information relating to functionality, information from database systems, information pertaining to completion of an external change management process, information about extent of usage of software, search trends, application performance information, information from customer relationship management systems, and so forth.

In the case of sentiment data, a third-party service may include a sentiment generation engine, which may use in-application surveys, for example, as a way of gauging user sentiment. By instrumenting the software 34 deployed in the target environment 52 as it presents such third-party surveys to users on occasion, the third-party service may determine user sentiment about the software 34. In another approach, a cognitive service may monitor certain use of keywords on a social networking service such as TWITTER or FACEBOOK and perform textual analysis, analysis of "likes" and other user feedback, etc., to thereby determine user sentiment for the staged software 34. Regarding use statistics, a first gate 28 may be configured to query the number of concurrent users interacting with the software 34 deployed in the staging environment 52 to determine usage trends. Regarding operation information relating to website functions, information from database systems, and application information, an APM service may query a service to determine, for example, whether errors are occurring as evidenced by failing website functions, database errors, or application server errors. Further, regarding search services, these could be queried to determine how certain keyword searches related to the software 34 are trending on the search service. These are but a few examples of how the gates 28, 30 could be configured to query external or third-party information sources and conditional logic could be built into the gates 28, 30 to act on the information retrieved from these external or third-party information sources.

In a target environment 52 of the cloud-based hosting environment 22, the processor 26 may be further configured to deploy the software 34 to be accessible to a subset of end users. The subset of end users may be a smaller number of users compared to the end users that may access software 34 on the production environment 62. During a monitoring period 54, the processor 26 may be configured to continuously receive and monitor, from the target environment 52 of the cloud-based hosting environment 22 as determined by the at least one query 40, the results data 48, 50 from the deployed software 34. The processor 26 may be configured to evaluate the results data 48, 50 according to the criteria 36 for evaluation 56 and change states of the gates 58, 60 as determined by the evaluation 56. As shown in FIG. 5, a developer may set various evaluation options. For example, gates 58, 60 may be evaluated every 5 minutes, or alternatively, gates 58, 60 may be continuously evaluated. A potential advantage of this operation may be a reduction of the workload of developers in the software testing process while the frequency with which results are provided is increased.

The processor 26 may be configured to determine that approval conditions 72 have been met for the software 34, at least in part based on the changed states of the gates 58, 60. It will be appreciated that, depending on developer standards and criteria 36, 38, a part of the gates 28, 30 or all of the gates 28, 30 may have changed states 58, 60. The changed states 58, 60 of the gates 28, 30 may be recently changed or they may have changed during a predetermined time over which changing of the states 58, 60 is acceptable. It will be appreciated that, as shown in FIG. 5, the developer may set a timeout after which the gates 28, 30 are considered to have failed. The processor 26 may be further configured to deploy the software 34 to a production environment 62 of the cloud-based hosting environment 22 to be accessible to end users. As shown in FIG. 5, various approval settings may be optional. A developer may request approval before gates 28, 30 are enabled, after approval conditions 72 have been met for the gates 28, 30, or the outcome or states of the gates 58, 60 may be set by the developer to be ignored and approvals requested regardless.

Evaluation 56 of results data 48, 50 for each of the enabled gates 28, 30 may be executed in parallel by the processor 26. This feature may provide a potential advantage over manual management of sign-off checklists for software testing by developers in that multiple gates 28, 30 may be monitored simultaneously. The processor 26 may be further configured to receive developer-defined thresholds for the criteria 36, 38 for evaluation 56. An example threshold may be, in the example of social network sentiments, 25% approval in sentiment feedback. In FIG. 6, during a manual setting of query 40, the developer may have a field into which a threshold may be entered. It will be appreciated that the criteria 36, 38 may have multiple queries 40, 42, 44, 46, each of which may have a respective threshold 64, 66, 68, 70 set. Implementations of the computing system 10 may include multiple thresholds for each query 40, 42, 44, 46, ranges for the thresholds 64, 66, 68, 70, and/or mathematically or programmatically defined parameters for the thresholds 64, 66, 68, 70. The state of each of the plurality of gates 58, 60 may be changed as determined by evaluation 56 of the results data 48, 50 according to the developer-defined thresholds 64, 66, 68, 70. A developer may choose, for example, to require that the software 34 be completely bug-free (i.e., that all known bugs be resolved) before the states of the gate 58, 60 may be changed.

The computing system 10 may be configured to deploy an older release of the software 34 if the software 34 does not successfully pass validation in the monitoring period 54. When approval conditions 72 are determined to be met for the software 34 as determined by evaluation 56 of results data 48, 50, which may be according to the developer-defined thresholds 64, 66, 68, 70, the state of each of the plurality of gates 58, 60 may be changed accordingly. In this situation, deployment to the target environment 52 may end before the end of the monitoring period 54. However, if the state of each of the gates 58, 60 is not satisfactory according to the standards of the developer, for example, the software 34 to be deployed may revert to an older release for deployment to the production environment 62.

The processor 26 may be further configured to programmatically deploy the software 34 to the production environment 62 of the cloud-based hosting environment 22 according to the state of the gates 58, 60. That is, once the system 10 determines that the approval conditions 72 are met and the states of the gates 58, 60 change such that developer-defined standards are met, the software 34 may be deployed automatically by the system 10 to the production environment 62 without any further input from the developer. This has a potential advantage that the monitoring and deployment processes may be automated either partly or fully from end-to-end. Therefore, a developer may set standards for the states of the gates 58, 60 such that the developer need not undertake further analysis or validation steps before deployment of the software 34 to the production environment 62. Not only may it be possible to potentially reduce workloads of developers, but monitoring, management, and deployment of software 34 may be standardized to the extent that the judgement of multiple developers, which may be heuristic in nature, is not required for validation. Consequently, a level of predictability may be introduced to the testing of software 34.

The processor 26 may be further configured to receive developer input for manual execution of monitoring the results data 48, 50, evaluating the results data 48, 50, and/or changing the states of the gates 58, 60. A potential advantage of the system 10 is that developers may be as involved in the monitoring, management, and deployment process as desired, automating some execution of monitoring while keeping manual control over some steps. The process, if desired, may be potentially fully automated once a developer has set standards for thresholds 64, 66, 68, 70, evaluation 56, approval conditions 72, and/or other parameters of the testing and deployment process.

The processor 26 may be further configured to filter noise in the results data 48, 50 before evaluation 56 of the results data 48, 50. In one example, the developer may recognize that results data 48, 50 is expected to oscillate during an initial period in the monitoring process. Consequently, the developer may set filter conditions such that results data 48, 50 may be ignored for some initial programmatically determined or preset period of time during monitoring of the software 34 in the target environment 52. This is shown in FIG. 5, where a delay before evaluation is set for 30 minutes; the time that is set may vary from minutes to hours, for example. Alternatively, the developer may wish to ignore some of the results data 48, 50 that is lower priority for validation. For example, multiple tests may be set for the software 34 to pass. However, if the results data 48, 50 begins to be too far outside a range of the criteria 36, 38 for a given test, the developer may want the test results to be ignored. A manual or automatic filter may be set by the developer, therefore, to dismiss test results under such conditions.

The approval condition 72 may include that each state of each of the plurality of gates 58, 60 does not change for a pre-determined period of time. It will be appreciated that in other implementations, the aggregate result 74 determines an aggregate state of the gates. In some implementations, it may be the aggregate state that is determined to meet the developer-defined standards for a pre-determined period of time. Additionally, the processor 26 may be further configured to override the monitoring period 54 according to a developer-defined setting to deploy the software 34 to the production environment 62 of the cloud-based hosting environment 22. A potential advantage of this configuration is that developers may monitor gates 28, 30, change queries 40, 42, 44, 46, and/or perform overrides such that deployment to the production environment 62 may happen more quickly and/or more efficiently. Monitoring the states of the gates 58, 60 either automatically or manually may be part of a process to more efficiently run the computing system 10 for decreased time to validation of software 34.

Figure 3:
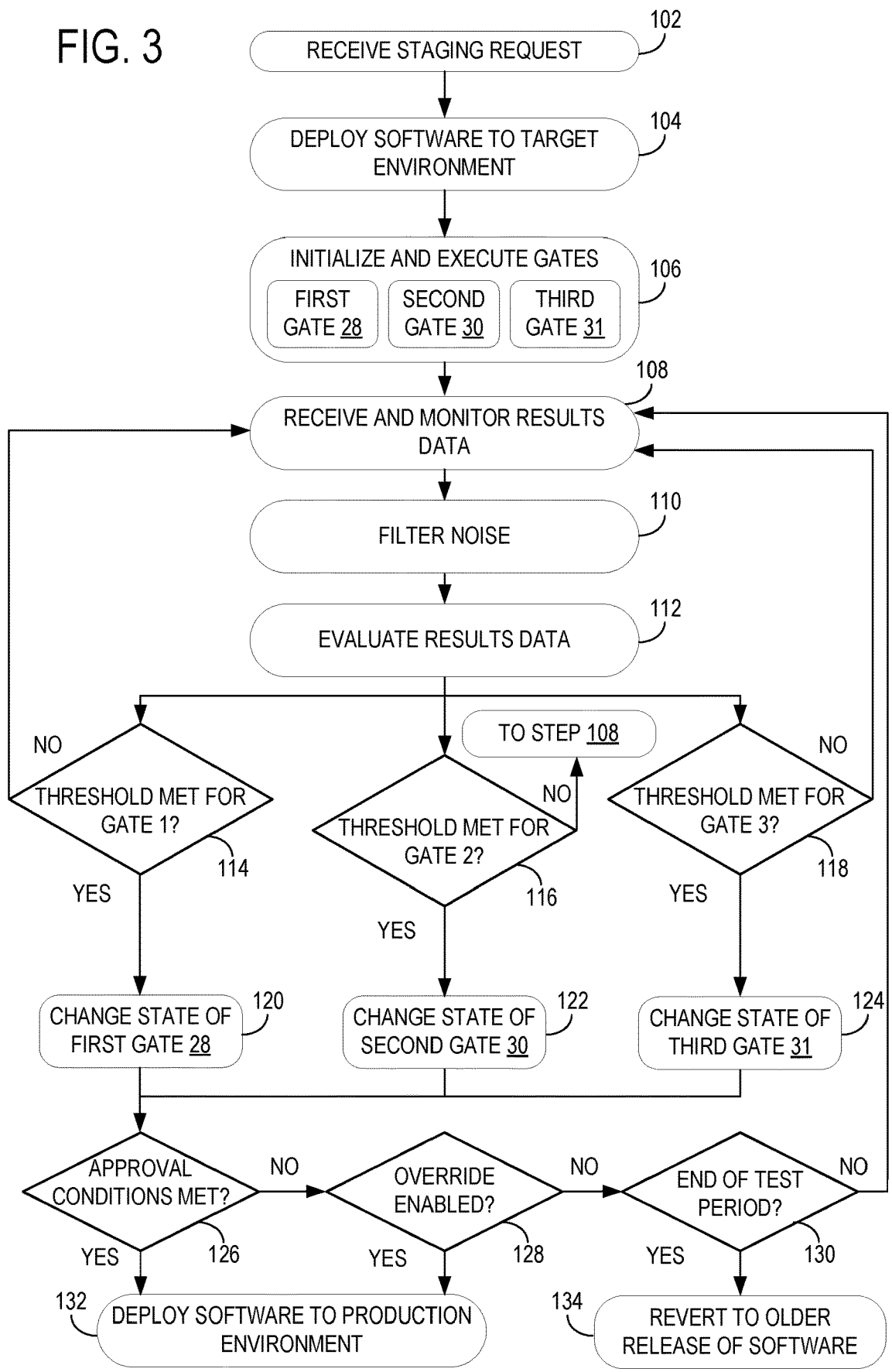
FIG. 3 is a detailed flowchart of an example implementation of the computing system for management of a pipeline for software delivery of FIG. 2.

Turning now to FIG. 3, a detailed flowchart of an example implementation of the computing system 10 for management of a CD pipeline 12 for software delivery is given. At step 102, the processor 26 of the client device 14 receives a staging request from a developer for software 34 to be deployed to the cloud-based hosting environment 22. This may activate a user interface 16 into which the developer may begin to enter further configurations for the monitoring and deployment conditions. At step 104, the developer may deploy the software 34 to the target environment 52. At 106, the developer may use the CD platform 20 to initialize and execute one or more gates 28, 30, 31. As shown in FIG. 2 and described above, the gates 28, 30, and an additional gate, third gate 31 in FIG. 3, may include criteria 36, 38 for evaluation 56 of the software 34 to be deployed. It will be appreciated that developers may define and enable as many gates as necessary or desired for monitoring software 34, however only three gates are shown in FIG. 3 for the sake of brevity. The criteria 36, 38 may include developer-defined thresholds 64, 66, 68, 70 to which the results data 48, 50 may be held.

In the target environment 52, a subset of users may be able to interact with the software 34. This interaction may be received and monitored at 108 through cloud services 32 as results data 48, 50. At this juncture, noise filters may be applied to the results data 48, 50, at step 110 as described above. At step 112, the results data 48, 50 may be evaluated according to the criteria 36, 38 set by the developer for the gates 28, 30, 31. The evaluation 56 may proceed as described above.

The evaluation of the first gate 28, the second gate 30, and the third gate 31 continues at steps 114, 116, and 118, respectively. In the implementation shown in FIG. 3, thresholds 64, 66, 68, 70 have been set for the gates 28, 30, 31. Each gate 28, 30, 31 is monitored via the processor 26 to determine whether the thresholds 64, 66, 68, 70 are met for the gates 28, 30, 31 to which they have been set. The thresholds 64, 66, 68, 70 may include various parameters as described above. If the results data 48, 50 is within the threshold 64, 66, 68, 70 of the respective gate 28, 30, 31, a state of the gate 58, 60 may be changed. For example, if the first results data 48 is below a 1% failure rate for the first gate 28, the state of the first gate 58 may be changed at 120 to a pass state. However, if the results data 48, 50, is outside of acceptable thresholds 64, 66, 68, 70, the states of the respective gates 58, 60 may not be changed and the CD pipeline 12 may return to step 108, where further results data 48, 50 are received and monitored.

In the implementation shown in FIG. 3, once the states of the gates 58, 60 are changed to a pass state, at step 126 the processor 26 may be configured to check whether all approval conditions 72 have been met. The approval conditions 72 may include parameters other than the states of the gates 58, 60. The approval conditions 72 may also be based on states of the gates 58,60 over an extended period of time i.e. based on a pattern of evaluation of gates. Whether only the states of the gates 58, 60 are considered in the approval conditions 72 or not, at step 132 the software 34 may be deployed to the production environment 62 if the approval conditions 72 are met at step 126. In the case where the approval conditions 72 are not met, there may be a check in the CD pipeline 12 via the processor 26 at step 128 whether an override has been enabled. If the developer has enabled an override, the states of the gates 58, 60 may be ignored, and/or the approval conditions 72 may not be considered. In this case, the CD pipeline 12 proceeds to step 132 and the software 34 is deployed to the production environment 62. If an override has not been enabled, a check in the CD pipeline 12 may be enabled to determine whether the monitoring period 54 has ended at step 130. If the monitoring period 54 has ended, and approval conditions 72 have not been met and an override has not been enabled, the software 34 may revert to an older release for the production environment 62 at step 134. This may ensure the safety of the deployment of the software 34 to the production environment 62. If the monitoring period 54 has not ended at step 130, the CD pipeline 12 may return to step 108, where results data 48, 50 continues to be received and monitored.

Figure 4:
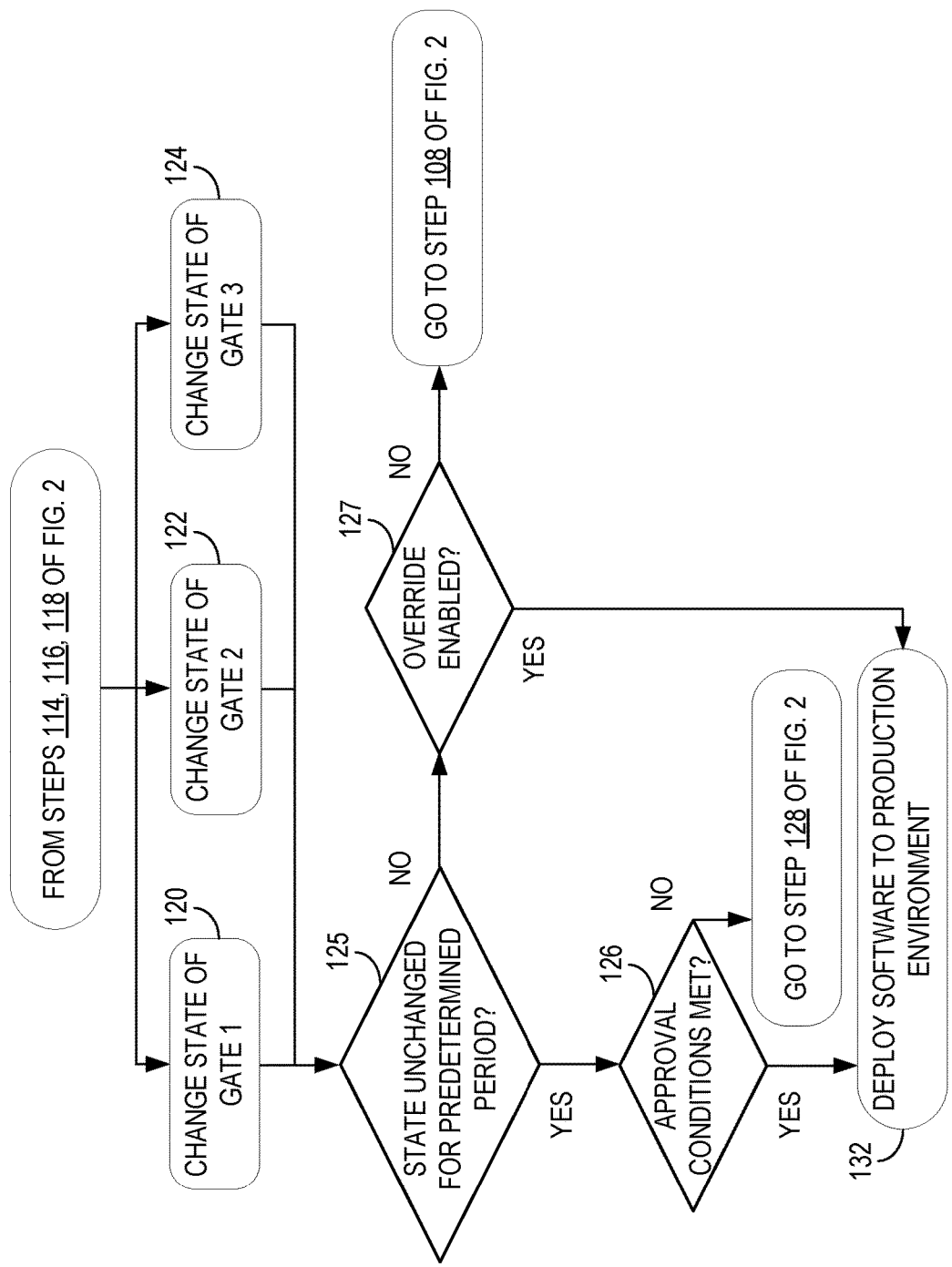
FIG. 4 is a detail of an example alternative implementation of the flowchart of FIG. 3.

FIG. 4 shows an alternative implementation of the testing and deployment sequence shown in FIG. 3. In FIG. 4, the states of the gates 58, 60 may still be changed at steps 120, 122, and 124. However, in this implementation, the developer has created a setting where the states of the gates 58, 60 are checked as to whether they have remained unchanged for a predetermined period of time at step 125. Such a condition allows a developer to increase the robustness of the criteria 36, 38 by requiring that the states of the gates 58, 60 remain in a pass state for some period of time, as opposed to merely attaining a pass state as in the implementation shown in FIG. 3. Consequently, the criteria 36, 38 may be more rigorous. If the states of the gates 58, 60 have remained unchanged for the predetermined period of time at step 125, the CD pipeline 12 proceeds to step 126 similarly to FIG. 3, and the remaining steps from step 126 are unchanged.

However, if the states of the gates 58, 60 have not remained unchanged for a predetermined period of time, then at step 127 there may be a check in the CD pipeline 12 for an override condition. If an override is enabled, then the software 34 may be deployed to the production environment 62 regardless of the states of the gates 58, 60. However, if no override has been enabled, the CD pipeline 12 returns to step 108 in FIG. 3 and results data 48, 50 continues to be received and monitored.

Figure 8:
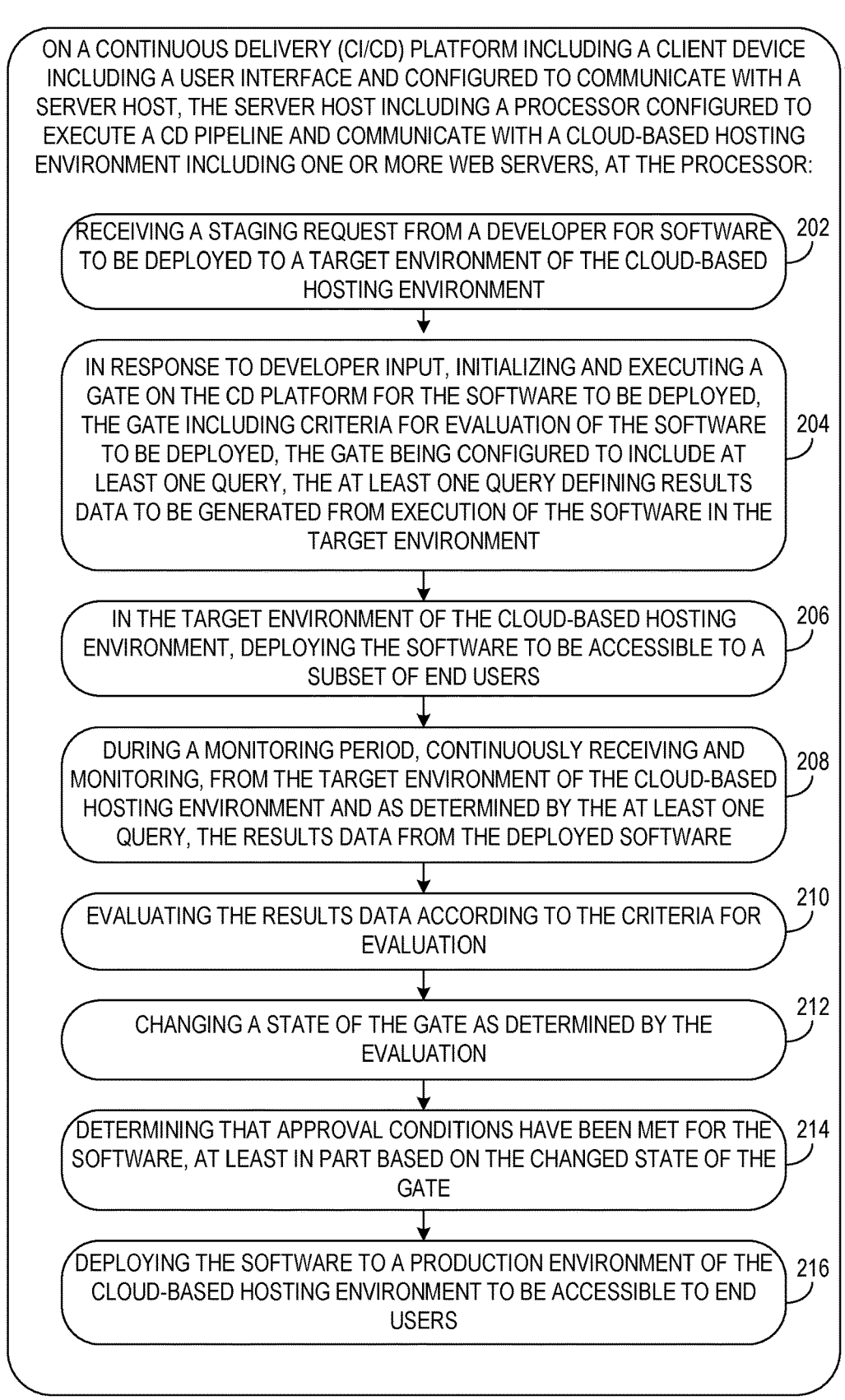
FIG. 8 is a flowchart of a method for use with a computing device of the computing system of FIG. 2.

FIG. 8 shows a flowchart of a method 200 for use with a computing device of the computing system 10. The following description of method 200 is provided with reference to the computing systems described above and shown in FIG. 2. It will be appreciated that method 200 may also be performed in other contexts using other suitable components.

With reference to FIG. 8, the method 200 may be used with a computing device on a continuous delivery (CD) platform 20 including a client device 14 with a user interface 16, the client device 14 configured to communicate with a server host 18. The server host 18 may include a processor 26 configured to execute a CD pipeline 12 and communicate with a cloud-based hosting environment 22. One or more web servers 24 may be included in the cloud-based hosting environment 22. At a processor 26 of the client device 14, the method 200 at 202 may include receiving a staging request from a developer for software 34 to be deployed to the cloud-based hosting environment 22. The method 200 at 204 may include, in response to developer input, initializing and executing a first gate 28 on the CD platform 20 for the software 34 to be deployed, the first gate 28 including criteria 36 for evaluation 56 of the software 34 to be deployed, the first gate 28 being configured to include at least one query 40, the at least one query 40 defining first results data 48 to be generated from execution of the software 34 in the target environment 52.

At 206, the method 200 may include, in a target environment 52 of the cloud-based hosting environment 22, deploying the software 34 to be accessible to a subset of end users. The method 200 at 208 may include, during a monitoring period 54, continuously receiving and monitoring, from the target environment 52 of the cloud-based hosting environment 22 and as determined by the at least one query 40, the results data 48, 50 from the deployed software 34.

At 210, the method 200 may include evaluating the first results data 48 according to the criteria 36 for evaluation 56. At 212, the method 200 may include changing a state of the gate 58 as determined by the evaluation 56. The method 200 at 214 may include determining that approval conditions 72 have been met for the software 34, at least in part based on the changed state of the gate 58. At 216, the method 200 may include deploying the software 34 to a production environment 62 of the cloud-based hosting environment 22 to be accessible to end users.

The processor 26 may be further configured such that the method 200 includes initializing and executing a plurality of gates 28, 30 in the CD pipeline 12, as described above. An aggregate result 74 may be generated from a plurality of states 58, 60, each state of the plurality of states 58, 60 associated with a respective gate of the plurality of gates 28, 30. Evaluation 56 of results data 48, 50 for each of the executed gates 28, 30 may be executed in parallel by the processor 26. The processor 26 may be further configured such that the method 200 includes receiving developer-defined thresholds 64, 66, 68, 70 for the criteria 36, 38 for evaluation 56. The state of each of the plurality of gates 58, 60 may be changed as determined by evaluation 56 of the results data 48, 50 according to the developer-defined thresholds 64, 66, 68, 70, as described above.

The computing system 10 may be configured to deploy an older release of the software 34 if the software 34 does not successfully pass validation in the monitoring period 54. When approval conditions 72 are determined to be met for the software 34 as determined by evaluation 56 of results data 48, 50, which may be according to the developer-defined thresholds 64, 66, 68, 70, each state of each of the plurality of gates 58, 60 may be changed accordingly. In this situation, deployment to the target environment 52 may end before an end the monitoring period 54. However, if the state of each of the gates 58, 60 is not satisfactory according to the standards of the developer, for example, the software 34 to be deployed may revert to an older release for deployment to the production environment 62. The processor 26 may be further configured such that the method 200 includes programmatically deploying the software 34 to the production environment 62 of the cloud-based hosting environment 22 according to the states of the gates 58, 60.

The processor 26 may be further configured such that the method 200 includes receiving developer input for manual execution of monitoring the results data 48, 50, evaluating the results data 48, 50, and/or changing the states of the gates 58, 60. The approval condition 72 may include that the state of each of the plurality of gates 58, 60 does not change for a pre-determined period of time, as described above. The processor 26 may be further configured such that the method 200 includes overriding the monitoring period 54 according to a developer-defined setting to deploy the software 34 to the production environment 62 of the cloud-based hosting environment 22.

The computing system 10 may provide advantages to developers for software monitoring, management, and deployment, as discussed. The potential automation of some or all of the steps in the pipeline process may reduce the workload of developers, especially where better predictability or standardization is desired for software management. While manual options may be available to developers as described, efficiency of results data analysis may be improved while maintaining a high level of safety for the software to be deployed in the various environments.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
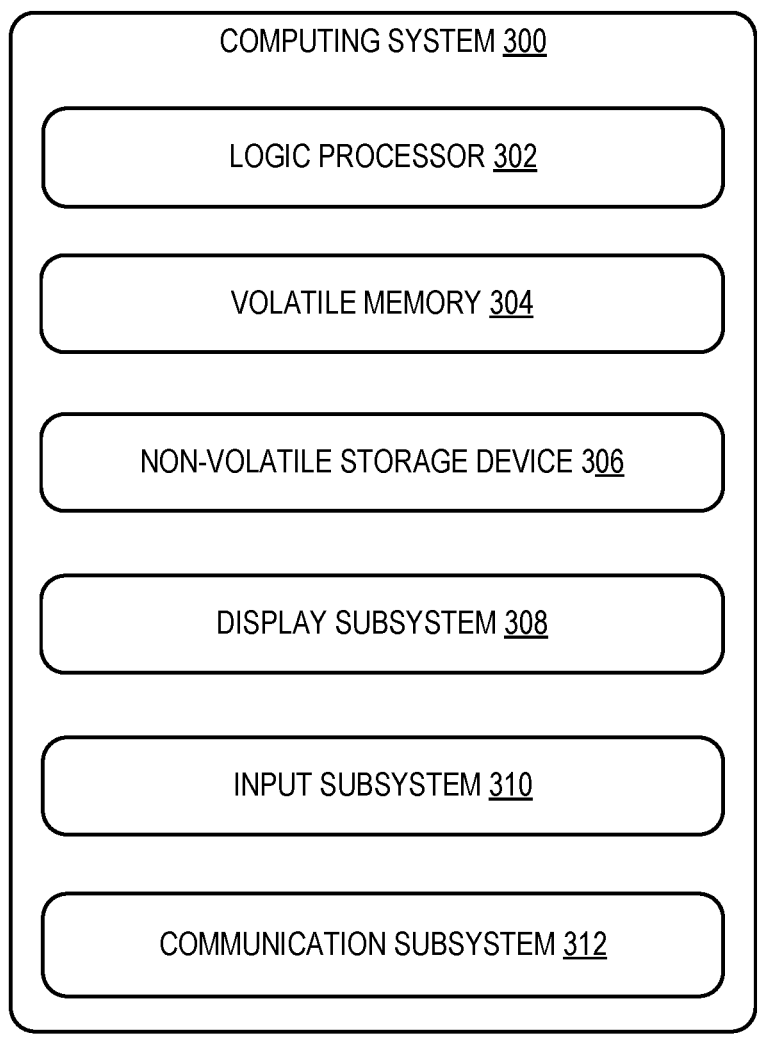
FIG. 9 is an example computing system according to an implementation of the present description.

FIG. 9 schematically shows a non-limiting embodiment of a computing system 300 that can enact one or more of the methods and processes described above. Computing system 300 is shown in simplified form. Computing system 300 may, for example, embody the computing system 10 of FIG. 2, or may instead embody some other computing system. Computing system 300 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented/virtual reality devices.

Computing system 300 includes a logic processor 302, volatile memory 304, and a non-volatile storage device 306. Computing system 300 may optionally include a display subsystem 308, input subsystem 310, communication subsystem 312, and/or other components not shown in FIG. 9.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 302 may include one or more physical processors (hardware) configured to execute software instructions. Additionally or alternatively, the logic processor 302 may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor 302 optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 300 implemented to perform a particular function. In some cases, a program may be instantiated via logic processor 302 executing instructions held by nonvolatile storage device 306, using portions of volatile memory 304. It will be understood that different programs may be instantiated from the same application, service, code block, object, library, routine, API, function, etc. Likewise, the same program may be instantiated by different applications, services, code blocks, objects, routines, APIs, functions, etc. The term "program" encompasses individual or groups of executable files, data files, libraries, drivers, scripts, database records, etc.

When included, display subsystem 308 may be used to present a visual representation of data held by non-volatile storage device 306. As the herein described methods and processes change the data held by the non-volatile storage device 306, and thus transform the state of the non-volatile storage device 306, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, or game controller. In some embodiments, the input subsystem 310 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection, gaze detection, and/or intent recognition; as well as electric-field sensing componentry for assessing brain activity; and/or any other suitable sensor.

When included, communication subsystem 312 may be configured to communicatively couple computing system 300 with one or more other computing devices. Communication subsystem 312 may include wired and/or wireless communication devices compatible with one or more different communication protocols. As non-limiting examples, the communication subsystem 312 may be configured for communication via a wireless telephone network, or a wired or wireless local- or wide-area network. In some embodiments, the communication subsystem 312 may allow computing system 300 to send and/or receive messages to and/or from other devices via a network such as the Internet.

The following paragraphs provide additional support for the claims of the subject application. One aspect provides a computing system, comprising a client device configured to communicate with a server host and including a user interface, the server host including a processor configured to execute a continuous delivery (CD) pipeline and communicate with a cloud-based hosting environment including one or more web servers. The processor is configured to receive a staging request from a developer for software to be deployed to a target environment of the cloud-based hosting environment, and in response to developer input, initialize and execute a gate on a CD platform for the software to be deployed. The gate includes criteria for evaluation of the software to be deployed, and the gate is configured to include at least one query; the at least one query defines results data to be generated from execution of the software in the target environment.

The processor is further configured to, in the target environment of the cloud-based hosting environment, deploy the software to be accessible to a subset of end users, and during a monitoring period, continuously receive and monitor, from the target environment of the cloud-based hosting environment and as determined by the at least one query, the results data from the deployed software. The processor is further configured to evaluate the results data according to the criteria for evaluation and change a state of the gate as determined by the evaluation. The processor is further configured to determine that approval conditions have been met for the software, at least in part based on the changed state of the gate, and deploy the software to a production environment of the cloud-based hosting environment to be accessible to end users.

In this aspect, additionally or alternatively, the processor may be further configured to initialize and execute a plurality of gates in the CD pipeline and generate an aggregate result from a plurality of states, each state of the plurality of states associated with a respective gate of the plurality of gates. In this aspect, additionally or alternatively, evaluation of the results data for each of the executed gates may be executed in parallel. In this aspect, additionally or alternatively, the processor may be further configured to receive developer-defined thresholds for the criteria for evaluation, and each state of each of the plurality of gates may be changed as determined by evaluation of the results data according to the developer-defined thresholds.

In this aspect, additionally or alternatively, either approval conditions may be determined to be met for the software as determined by evaluation of results data according to the developer-defined thresholds, each state of each of the plurality of gates changed accordingly, and deployment to the target environment ends before an end of the monitoring period, or the software may revert to an older release. In this aspect, additionally or alternatively, the processor may be configured to programmatically deploy the software to the production environment of the cloud-based hosting environment according to the state of the gate.

In this aspect, additionally or alternatively, the processor may be further configured to receive developer input for manual execution of at least one of the steps selected from the group consisting of monitoring the results data, evaluating the results data, and changing the state of the gate. In this aspect, additionally or alternatively, the processor may be further configured to filter noise in the results data before evaluation of the results data. In this aspect, additionally or alternatively, the approval condition may include that each state of each of the plurality of gates does not change for a pre-determined period of time. In this aspect, additionally or alternatively, the processor may be further configured to override the monitoring period according to a developer-defined setting to deploy the software to the production environment of the cloud-based hosting environment.

Another aspect provides a method for use with a computing device on a continuous delivery (CD) platform, the CD platform including a client device including a user interface and configured to communicate with a server host, the server host including a processor configured to execute a CD pipeline and communicate with a cloud-based hosting environment including one or more web servers. The method comprises, at the processor, receiving a staging request from a developer for software to be deployed to a target environment of the cloud-based hosting environment. The method further comprises, at the processor, in response to developer input, initializing and executing a gate on the CD platform for the software to be deployed, the gate including criteria for evaluation of the software to be deployed, the gate being configured to include at least one query, the at least one query defining results data to be generated from execution of the software in the target environment.

The method further comprises, at the processor, in the target environment of the cloud-based hosting environment, deploying the software to be accessible to a subset of end users, and during a monitoring period, continuously receiving and monitoring, from the target environment of the cloud-based hosting environment and as determined by the at least one query, the results data from the deployed software. The method further comprises, at the processor, evaluating the results data according to the criteria for evaluation; changing a state of the gate as determined by the evaluation; determining that approval conditions have been met for the software, at least in part based on the changed state of the gate; and deploying the software to a production environment of the cloud-based hosting environment to be accessible to end users.

In this aspect, additionally or alternatively, the method may further comprise, at the processor, initializing and executing a plurality of gates in the CD pipeline and generating an aggregate result from a plurality of states, each state of the plurality of states associated with a respective gate of the plurality of gates. In this aspect, additionally or alternatively, evaluating the results data for each of the executed gates may be executed in parallel. In this aspect, additionally or alternatively, the method may further comprise, at the processor, receiving developer-defined thresholds for the criteria for evaluation, and changing each state of the respective gate may be determined by evaluating the results data according to the developer-defined thresholds.

In this aspect, additionally or alternatively, either approval conditions may be determined to be met for the software as determined by evaluating the results data according to the developer-defined thresholds, each state of each of the plurality of gates changing accordingly, and deploying to the target environment ends before an end of the monitoring period, or the software may revert to an older release. In this aspect, additionally or alternatively, the method may further comprise, at the processor, programmatically deploying the software to the production environment of the cloud-based hosting environment according to the state of the gate.

In this aspect, additionally or alternatively, the method may further comprise, at the processor, receiving developer input for manual execution of at least one of the steps selected from the group consisting of monitoring the results data, evaluating the results data, and changing the state of the gate. In this aspect, additionally or alternatively, the approval condition may include that each state of each of the plurality of gates does not change for a pre-determined period of time. In this aspect, additionally or alternatively, the method may further comprise, at the processor, overriding the monitoring period according to a developer-defined setting, for deploying the software to the production environment of the cloud-based hosting environment.

Another aspect provides a computing system comprising a client device configured to communicate with a server host and including a user interface, the server host including a processor configured to execute a continuous delivery (CD) pipeline and communicate with a cloud-based hosting environment including one or more web servers. The processor is configured to receive a staging request from a developer for software to be deployed to a target environment of the cloud-based hosting environment, and, in response to developer input, initialize and execute a plurality of gates on a CD platform for the software to be deployed. The plurality of gates includes criteria for evaluation of the software to be deployed including developer-defined thresholds, and the plurality of gates is configured to include at least one query, the at least one query defining results data to be generated from execution of the software in the target environment.

The processor is further configured to, in the target environment of the cloud-based hosting environment, deploy the software to be accessible to a subset of end users, and, during a monitoring period, continuously receive and monitor, from the target environment of the cloud-based hosting environment and as determined by the at least one query, the results data from the deployed software. The processor is further configured to evaluate the results data for the plurality of gates in parallel according to the criteria for evaluation and change a state of at least one of the plurality of gates as determined by the evaluation of the results data according to the developer-defined thresholds. The processor is further configured to determine that approval conditions have been met for the software, at least in part based on the changed state of the at least one of the plurality of gates, and deploy the software to a production environment of the cloud-based hosting environment to be accessible to end users.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
  a developer client device configured to communicate with a server host and including a developer user interface, the server host including a processor configured to execute a continuous delivery (CD) pipeline and communicate with a cloud-based hosting environment including one or more web servers, the processor of the server host being configured to:
    receive a staging request from a initiated at the developer client device based on developer input provided via the developer user interface, the staging request being for software to be deployed to a target user testing environment of the cloud-based hosting environment;
    initialize and execute a gate on a CD platform for the software to be deployed for the staging request, the gate including criteria for evaluation of the software to be deployed, the gate being configured to include at least one query, the at least one query defining results data to be generated from end user interactions with the software executed in the target user testing environment, the results data including data from an external information source indicating user sentiment;

in the target user testing environment of the cloud-based hosting environment, deploy the software to be accessible to a subset of end users;

during a monitoring period, continuously receive and monitor, the results data from the external information source;

evaluate the results data according to the criteria for evaluation;

change a state of the gate when the criteria for evaluation are met;

determine that approval conditions have been met for the software, at least in part based on the changed state of the gate; and deploy the software to a production environment of the cloud-based hosting environment to be accessible to end users following determining that the approval conditions have been met for the software.

2. The system of claim 1, the processor further configured to initialize and execute a plurality of gates in the CD pipeline and generate an aggregate result from a plurality of states, each state of the plurality of states associated with a respective gate of the plurality of gates.

3. The system of claim 2, wherein evaluation of the results data for each of the executed gates is executed in parallel.

4. The system of claim 2, the processor further configured to receive developer-defined thresholds for the criteria for evaluation, wherein each state of each of the plurality of gates is changed as determined by evaluation of the results data according to the developer-defined thresholds.

5. The system of claim 4, wherein either approval conditions are determined to be met for the software as determined by evaluation of results data according to the developer-defined thresholds, each state of each of the plurality of gates changed accordingly, and deployment to the target user testing environment ends before an end of the monitoring period, or the software reverts to an older release.

6. The system of claim 1, the processor further configured to programmatically deploy the software to the production environment of the cloud-based hosting environment according to the state of the gate.

7. The system of claim 1, the processor further configured to receive developer input for manual execution of at least one of the steps selected from the group consisting of monitoring the results data, evaluating the results data, and changing the state of the gate.

8. The system of claim 1, the processor further configured to filter noise in the results data before evaluation of the results data.

9. The system of claim 2, wherein the approval condition includes that each state of each of the plurality of gates does not change for a pre-determined period of time.

10. The system of claim 1, the processor further configured to override the monitoring period according to a developer-defined setting to deploy the software to the production environment of the cloud-based hosting environment.

11. A method for use with a computing device, comprising:

on a continuous delivery (CD) platform including a developer client device including a developer user interface and configured to communicate with a server host, the server host including a processor configured to execute a CD pipeline and communicate with a cloud-based hosting environment including one or more web servers, at the processor of the server host:

receiving a staging request from a initiated at the developer client device based on developer input provided via the developer user interface, the staging request being for software to be deployed to a target user testing environment of the cloud-based hosting environment;

initializing and executing a gate on the CD platform for the software to be deployed for the staging request, the gate including criteria for evaluation of the software to be deployed, the gate being configured to include at least one query, the at least one query defining results data to be generated from end user interactions with the software executed in the target user testing environment, the results data including data from an external information source indicating user sentiment;

in the target user testing environment of the cloud-based hosting environment, deploying the software to be accessible to a subset of end users;

during a monitoring period, continuously receiving and monitoring, the results data from the external information source;

evaluating the results data according to the criteria for evaluation;

changing a state of the gate when the criteria for evaluation are met;

determining that approval conditions have been met for the software, at least in part based on the changed state of the gate; and deploying the software to a production environment of the cloud-based hosting environment to be accessible to end users following determining that the approval conditions have been met for the software.

12. The method of claim 11, further comprising initializing and executing a plurality of gates in the CD pipeline and generating an aggregate result from a plurality of states, each state of the plurality of states associated with a respective gate of the plurality of gates.

13. The method of claim 12, wherein evaluating the results data for each of the executed gates is executed in parallel.

14. The method of claim 12, further comprising receiving developer-defined thresholds for the criteria for evaluation, wherein changing each state of the respective gate is determined by evaluating the results data according to the developer-defined thresholds.

15. The method of claim 14, wherein either approval conditions are determined to be met for the software as determined by evaluating the results data according to the developer-defined thresholds, each state of each of the plurality of gates changing accordingly, and deploying to the target user testing environment ends before an end of the monitoring period, or the software reverts to an older release.

16. The method of claim 11, further comprising programmatically deploying the software to the production environment of the cloud-based hosting environment according to the state of the gate.

17. The method of claim 11, further comprising receiving developer input for manual execution of at least one of the steps selected from the group consisting of monitoring the results data, evaluating the results data, and changing the state of the gate.

18. The method of claim 12, wherein the approval condition includes that each state of each of the plurality of gates does not change for a pre-determined period of time.

19. The method of claim 11, further comprising overriding the monitoring period according to a developer-defined setting, for deploying the software to the production environment of the cloud-based hosting environment.

20. A computing system, comprising:
a developer client device configured to communicate with a server host and including a developer user interface, the server host including a processor configured to execute a continuous delivery (CD) pipeline and communicate with a cloud-based hosting environment including one or more web servers, the processor of the server host being configured to:
receive a staging request initiated at the developer client device based on developer input provided via the developer user interface, the staging request being for software to be deployed to a target user testing environment of the cloud-based hosting environment;
initialize and execute a plurality of gates on a CD platform for the software to be deployed for the staging request, the plurality of gates including criteria for evaluation of the software to be deployed including developer-defined thresholds, the plurality of gates being configured to include at least one query, the at least one query defining results data to be generated from end user interactions with execution of the software executed in the target user testing environment, the results data including data from an external information source indicating user sentiment;
in the target user testing environment of the cloud-based hosting environment, deploy the software to be accessible to a subset of end users;
during a monitoring period, continuously receive and monitor, the results data from the external information source;
evaluate the results data for the plurality of gates in parallel according to the criteria for evaluation;
change a state of at least one of the plurality of gates when the criteria for evaluation are met according to the developer-defined thresholds;
determine that approval conditions have been met for the software, at least in part based on the changed state of the at least one of the plurality of gates; and
deploy the software to a production environment of the cloud-based hosting environment to be accessible to end users following determining that the approval conditions have been met for the software.

* * * * *